Oct. 6, 1959    M. J. IRLAND ET AL    2,907,672
AUROUS COATING ON AN OPTICAL ELEMENT
Filed Aug. 25, 1958
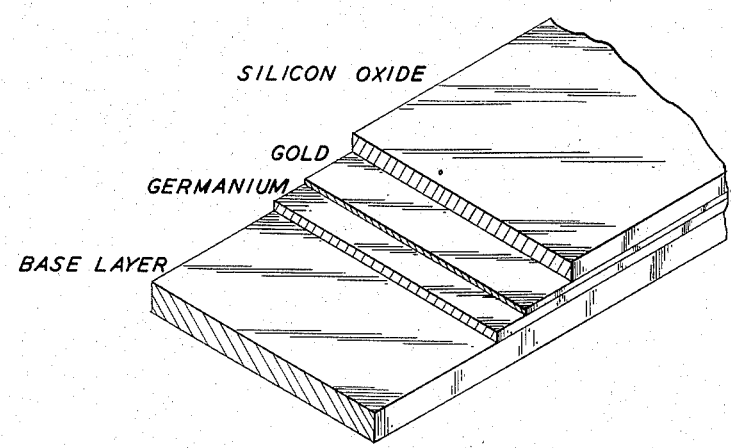
M.J. IRLAND
E.B. SCHERMER
J.E. GOLDMAN
INVENTOR.
BY E.C. McRae
J.R. Faulkner
J.H. Oster
ATTORNEYS

United States Patent Office 2,907,672
Patented Oct. 6, 1959

2,907,672

AUROUS COATING ON AN OPTICAL ELEMENT

Max J. Irland, Dearborn, and Eugene B. Schermer and Jacob E. Goldman, Detroit, Mich., assignors to Ford Motor Company, Dearborn, Mich., a corporation of Delaware Application August 25, 1958, Serial No. 756,900

6 Claims. (Cl. 117—33.3)

This invention is concerned with the optical sciences and is more specifically directed to a coating capable of application upon a soft, transparent, translucent or opaque substrate to protect the surface of such substrate from scratches and similar mechanical abrasions. This invention is further characterized by the provision of a coating which is capable of transmitting a useful fraction of visible light, i.e., between 10 percent and 50 percent while simultaneously reflecting a major portion, i.e., 70 percent to 85 percent of the longer wavelengths immediately adjacent to the visible spectrum, viz., 0.8 micron and longer. This invention is closely related to that disclosed and claimed in copending application Serial No. 735,182, filed May 14, 1958.

The optical art has long been aware of the possible economies in producing lenses and other optical components from readily moldable plastic materials which are inherently soft. While such lenses are optically acceptable for many applications, they have had small commercial acceptance because of their inability to resist scratching.

This invention supplies a coating which may be readily applied to such soft and readily molded plastics to give a usefully transparent or reflective protecting layer which will impart to the plastic a scratch resistance of the same order as ordinary optical glass. This type of coated plastic is also useful for motor vehicle components such as roof inserts and windshields.

The light transmitting ability of optical elements so coated may be caused to vary over the area of the element in such a manner as to transmit 10 percent or less of the visible light and reflect 85 percent of infrared radiation at one edge of the piece, and to transmit more and more visible light at points farther and farther removed from such edge up to 70 percent or more, so as to produce a shaded, smoothly graded, or tapered transmission. This type of construction is particularly useful in windshields.

As can readily be seen from an inspection of the sheet of drawing, this coating comprises a layer of germanium, a layer of gold and a layer of silicon oxide superimposed upon a base layer. For the sake of clarity of illustration, this drawing is not to scale in a vertical direction. The thickness of the germanium layer is much less than that of the silicon oxide layer. The thickness of the gold layer may be either more or less than that of the germanium layer.

The optical art is well aware of the benefits to be gained from the deposition of individual layers of germanium and silicon oxide on optical surfaces and is further aware of methods whereby these coatings may be laid down. For the benefit of those who may not be familiar with the literature on this subject, attention is invited to the following citations:

(1) J. E. Tausz and M. Tausz, The Protective Coating of Mirrors With an Oxide of Silicon, FIAT Final Report No. 1103, Office of Military Government for Germany (U.S.), 1947.

(2) L. Holland, Vacuum Deposition of Thin Films; London, Chapman and Hall, 1956; p. 110.

(3) G. Hass and N. W. Scott, J. Opt. Soc. Am. 39, 179 (1949).

(4) G. Hass, J. Opt. Soc. Am. 45, 945 (1955).

While this invention may be applied to any soft optical surface, it is preferred to work with the plastic sheet material which is chemically a polymethylmethacrylate commonly known and merchandised as Plexiglas, Lucite, Perspec, et. The thickness of the germanium layer may vary from a few Angstrom units up to 100 Angstrom units without materially affecting the invention. Similarly, the thickness of the upper layer of silicon oxide may vary from 1000 Angstrom units to 20,000 Angstrom units or more. Beyond 20,000 Angstrom units these silicon oxide films are prone to crack, check or peel spontaneously. The preferred thickness is 2500 to 5000 Angstrom units. The thickness of the gold layer is typically between 100 and 200 Angstrom units, but may be varied at will between a very thin layer and a layer 2000 Angstrom units thick. The latter will result in substantially opaque mirror having a reflectance exceeding 90 percent for red and infrared radiation. The preferred range is 50 to 400 Angstrom units. For applications which require 10 percent or more transmission of visible light, the gold thickness is limited to about 400 Angstrom units or less. In the range of 100 to 400 Angstrom units (approximately) the optical properties of special interest are those of reflecting infrared markedly more strongly than visible, and transmitting visible more strongly than infrared, as shown in Table II.

A typical example of this invention is detailed herewith. A sheet of polymethylmethacrylate plastic one-eighth inch thick was stripped of its protecting paper, washed thoroughly in normal hexane and dried carefully by parallel strokes of a cotton swab. The specimen was then placed face down in a 14 inch vacuum coating unit which had previously been equipped with separate heating elements to evaporate separately germanium, gold and a stoichiometric mixture of powdered silicon and silicon dioxide. This unit was pumped down to an absolute pressure of $10^{-5}$ mm. of mercury and the germanium evaporating filament energized. Evaporation of germanium was stopped when the transmission factor of the specimen to the light from a mercury vapor lamp had fallen to a value of approximately 72 percent from an initial value of 92 percent. With the same vacuum, gold was then evaporated from a separate source until the transmission for visible light fell to the desired value, such as 10 percent to 50 percent. The silicon oxide evaporating filament was then energized and the mixture of silicon and silicon dioxide heated to 1100° C. at which point an oxide of silicon of indefinite composition was formed and evaporated upon the polymethylmethacrylate sheet. It is preferred to admit into the vacuum chamber at this time a small stream of oxygen or atmospheric air, preferably in the immediate vicinity of the silicon oxide source. This results in the oxidation of the silicon oxide toward silicon dioxide and thereby yields a more transparent film. However, the vacuum is preferably maintained in the vicinity of $10^{-4}$ mm. mercury during this procedure. Progress of the deposition of the silicon oxide is observed by means of the mercury vapor lamp and the evaporation is preferably interrupted when the transmission of the specimen has reached its second maximum.

To test the resistance of the polymethylmethacrylate sheet so coated to abrasion, a comparison was made of this sheet with the glass of an ordinary microscope slide and an identical uncoated polymethylmethacrylate sheet. This test which is necessarily arbitrary in nature comprised drawing a weighted disc 1½ inches in diameter and faced with felt across the specimen a given number of times. The strokes were all in the same direction. Rubbing for one minute with felt impregnated with No. 600 emery under pressure of 0.7 pound per square inch produced the results tabulated below:

*Table I*

| | |
|---|---|
| Specimen A | $.58 \times 10^{-4}$ |
| Specimen B | $.62 \times 10^{-4}$ |
| Plexiglas, uncoated | $35.0 \times 10^{-4}$ |
| Glass | $1.38 \times 10^{-4}$ |

The values presented in the table above represent the ratio between the amount of light scattered into a microscope objective from a beam of light impinged upon the surface in question at a grazing angle and the amount of light specularly reflected from such a surface when oriented with regard to the light beam and the microscope objective to give the maximum value. A study of the table will show that the values obtained are distinctly comparable to that obtained with ordinary glass.

Typical optical properties of germanium, gold, silicon oxide coated plastic are detailed in the following table.

*Table II*

| Wavelength, microns | Transmission, Percent | | Reflection, Percent (Coated surface) | |
|---|---|---|---|---|
| | Specimen A | Specimen B | Specimen A | Specimen B |
| .35 | 14.1 | 2.8 | 18.1 | 8.7 |
| .45 | 27.2 | 8.1 | 23.3 | 35.7 |
| .55 | 45.6 | 15.1 | 9.3 | 35.3 |
| .65 | 28.3 | 5.0 | 42.9 | 73.4 |
| .80 | 14.1 | 1.7 | 68.7 | 85.9 |
| 1.00 | 10.8 | 0.9 | 73.2 | 88.3 |
| 1.20 | 9.3 | 0.9 | 70.0 | 86.9 |

While this invention has particular application to polymethylmethacrylate lenses it is by no means so limited and may be employed wherever it is desired to enhance the scratch resistance of a soft substrate. Such protection may well be extended to such structures as windshields, windows or to produce an abrasion-resistant front-surface mirror coating for rear view mirrors where a moderately bright reflected image is desired.

We claim as our invention:

1. An optical element having a resistance to scratching and mechanical abrasion of the same order as glass and comprising a massive substrate which is materially softer than glass, a layer of germanium adjacent the soft substrate, a layer of gold upon the layer of germanium and a layer of an oxide of silicon superimposed upon the gold layer.

2. An optical element having a resistance to scratching and mechanical abrasion of the same order as glass and comprising a massive substrate which is materially softer than glass, a layer of germanium adjacent the soft substrate and having a thickness up to 1000 Angstrom units, a layer of gold having a thickness up to 2000 Angstrom units upon the layer of germanium and a layer of an oxide of silicon having a thickness of up to 20,000 Angstrom units superimposed upon the gold layer.

3. An optical element having a resistance to scratching and mechanical abrasion of the same order as glass and comprising a massive substrate which is materially softer than glass, a layer of germanium adjacent the soft substrate and having a thickness of 100 to 1000 Angstrom units, a layer of gold having a thickness of 50 to 400 Angstrom units upon the layer of germanium and a layer of an oxide of silicon having a thickness of 2500 to 5000 Angstrom units superimposed upon the germanium layer.

4. An optical element having a resistance to scratching and mechanical abrasion of the same order as glass and comprising a massive substrate of a polymethylmethacrylate plastic, a layer of germanium adjacent this soft substrate, a layer of gold upon the layer of germanium and a layer of an oxide of silicon superimposed upon the gold layer.

5. An optical element having a resistance to scratching and mechanical abrasion of the same order as glass and comprising a massive substrate of a polymethylmethacrylate plastic, a layer of germanium adjacent this soft substrate and having a thickness of up to 1000 Angstrom units, a layer of gold having a thickness up to 2000 Angstrom units upon the layer of germanium and a layer of an oxide silicon having a thickness of up to 20,000 Angstrom units superimposed upon the gold layer.

6. An optical element having a resistance to scratching and mechanical abrasion of the same order as glass and comprising a massive substrate of polymethylmethacrylate plastic, a layer of germanium adjacent this soft substrate and having a thickness of 100 to 1000 Angstrom units, a layer of gold having a thickness of 50 to 400 Angstrom units upon the layer of germanium and a layer of an oxide of silicon having a thickness of 2500 to 5000 Angstrom units superimposed upon the germanium layer.

No references cited.